(12) United States Patent
Woronowicz et al.

(10) Patent No.: US 10,186,905 B2
(45) Date of Patent: Jan. 22, 2019

(54) METHOD OF OPERATING A THREE PHASE PRIMARY WINDING STRUCTURE AND A PRIMARY UNIT

(71) Applicant: Bombardier Primove GmbH, Berlin (DE)

(72) Inventors: Konrad Woronowicz, Kingston (CA); Robert Czainski, Szczecin (PL); Dominik Anders, Mannheim (DE); Alireza Safaee, Danvers, MA (US)

(73) Assignee: Bombardier Primove GmbH, Berlin (DE)

( * ) Notice: Subject to any disclaimer, the term of this patent is extended or adjusted under 35 U.S.C. 154(b) by 289 days.

(21) Appl. No.: 15/037,569

(22) PCT Filed: Nov. 18, 2014

(86) PCT No.: PCT/EP2014/074889
§ 371 (c)(1),
(2) Date: May 18, 2016

(87) PCT Pub. No.: WO2015/075026
PCT Pub. Date: May 28, 2015

(65) Prior Publication Data
US 2016/0301250 A1    Oct. 13, 2016

(30) Foreign Application Priority Data

Nov. 19, 2013  (GB) .................................. 1320400.3

(51) Int. Cl.
*B60L 11/18* (2006.01)
*H02J 50/10* (2016.01)
(Continued)

(52) U.S. Cl.
CPC ............ *H02J 50/10* (2016.02); *B60L 11/182* (2013.01); *B60L 11/1809* (2013.01);
(Continued)

(58) Field of Classification Search
None
See application file for complete search history.

(56) References Cited

U.S. PATENT DOCUMENTS

2007/0176577 A1    8/2007  Kezobo et al.
2010/0072987 A1*   3/2010  Nakano ................ G01D 5/2046
                                                       324/207.15
(Continued)

FOREIGN PATENT DOCUMENTS

GB          2463692 A      3/2010
GB          2512864 A      10/2014
(Continued)

*Primary Examiner* — Jared Fureman
*Assistant Examiner* — Joel Barnett
(74) *Attorney, Agent, or Firm* — The Webb Law Firm

(57) ABSTRACT

The invention relates to a method of operating a three phase primary winding structure of a system for inductive power transfer, wherein the primary winding structure includes a first phase line, a second phase line and a third phase line, wherein in a standard operational mode a first phase input voltage, a second phase input voltage and a third phase input voltage are controlled such that a predetermined phase shift between all three phase input voltages is provided, wherein in a modified operational mode the first phase input voltage, the second phase input voltage and the third phase input voltage are controlled such that the set of phase shift values includes at most two non-zero values and all non-zero phase shift values are equal. Furthermore, the invention relates to a primary unit of a system for inductive power transfer.

15 Claims, 5 Drawing Sheets

(51) Int. Cl.
    *H02J 7/02*     (2016.01)
    *B60M 7/00*    (2006.01)
    *H02M 7/537*   (2006.01)

(52) U.S. Cl.
    CPC .......... *B60L 11/1812* (2013.01); *B60M 7/003*
        (2013.01); *H02J 7/025* (2013.01); *H02M*
        *7/537* (2013.01); *B60L 2200/26* (2013.01);
        *B60L 2210/30* (2013.01); *Y02T 10/7005*
        (2013.01); *Y02T 10/7072* (2013.01); *Y02T*
        *10/7241* (2013.01); *Y02T 90/122* (2013.01);
        *Y02T 90/127* (2013.01); *Y02T 90/14* (2013.01)

(56)          References Cited

U.S. PATENT DOCUMENTS

| 2011/0285349 A1 | 11/2011 | Widmer et al. |
| 2012/0032633 A1 | 2/2012 | Cordes et al. |
| 2012/0044727 A1* | 2/2012 | Bartsch ............ H02J 3/26 363/74 |
| 2012/0055751 A1* | 3/2012 | Vollenwyder ........ B60L 5/005 191/10 |
| 2013/0193276 A1* | 8/2013 | Hunter ............ B61L 25/025 246/122 R |
| 2013/0214729 A1* | 8/2013 | Gati ................ B60L 11/1816 320/107 |
| 2013/0305760 A1 | 11/2013 | Shinomoto et al. |
| 2014/0292243 A1* | 10/2014 | Bouchez ............ H02M 7/003 318/400.29 |

FOREIGN PATENT DOCUMENTS

| JP | 200970087 A | 4/2009 |
| WO | 2005091488 A1 | 9/2005 |
| WO | 2010062198 A1 | 6/2010 |
| WO | 2010115867 A1 | 10/2010 |
| WO | 2012107987 A1 | 8/2012 |
| WO | 2013064780 A2 | 5/2013 |

* cited by examiner

METHOD OF OPERATING A THREE PHASE PRIMARY WINDING STRUCTURE AND A PRIMARY UNIT

CROSS-REFERENCE TO RELATED APPLICATIONS

This application is the United States national phase of International Application No. PCT/EP2014/074889 filed Nov. 18, 2014, and claims priority to United Kingdom Patent Application No. 1320400.3 filed Nov. 19, 2013, the disclosures of which are hereby incorporated in their entirety by reference.

BACKGROUND OF THE INVENTION

Field of the Invention

The invention relates to a method of operating a three phase primary winding structure of a system for inductive power transfer and a primary unit of said system for inductive power transfer.

Description of Related Art

Vehicles, in particular electric vehicles and/or a track-bound vehicle and/or a road automobile, can be operated by electric energy which is transferred by means of an inductive power transfer.

The inductive power transfer is usually performed using a primary unit which generates an alternating electromagnetic field and a secondary unit which comprises a receiving device for receiving said electromagnetic field.

The primary unit and the secondary unit can e.g. each comprise a set of three-phase windings. A set of windings of the primary unit can be installed on the ground (primary winding structure) and can be fed by a wayside power converter (WPC). A set of windings of the secondary unit (secondary winding structure) is installed on the vehicle. For example, the secondary winding structure can be attached underneath the vehicle, in the case of trams under some of its wagons.

Furthermore, such a vehicle can comprise a rectifier adapted to convert an alternating current (AC) to a direct current (DC). The DC can be used to charge a traction battery or to operate an electric machine. A rectifier converts the AC provided by the receiving device into the DC.

The first and the secondary side, in particular the primary and the secondary winding structure, can be part of a high frequency transformer to transfer electric energy to the vehicle. This transfer can be done in a static state (when there is no movement of the vehicle) and in a dynamic state (when the vehicle moves).

To provide an efficient inductive power transfer, it is desirable to have a tuned inductive power transfer system. This means that a resonant frequency of primary and secondary winding structures which depends on the capacitive and inductive elements of these winding structures matches a predetermined operating frequency. In a tuned system, the maximal power transfer efficiency can be reached.

The aforementioned resonant frequency depends on the mutual coupling between the primary and secondary winding structure. As the mutual coupling depends on an alignment of the primary winding structure relative to the secondary winding structure, the alignment will have an impact on the power transfer efficiency. In particular in the case of a misalignment, the power transfer efficiency decreases.

Moreover, if power needs to be transferred to an automobile inductively, it is desirable to have small dimensions of a primary unit. In this case, however, even small misalignments will result in a significant decrease of the power transfer efficiency.

SUMMARY OF THE INVENTION

It is an object of the present invention to provide a method of operating a three phase primary winding structure and a primary unit which allow reliable and fast compensation of a decreased power transfer efficiency, in particular in the case of a misalignment between the primary winding structure and the secondary winding structure.

It is a basic idea of the invention to modify the standard operation of a three phase primary winding structure such that predetermined operational criteria, in particular criteria related to the transferred power, voltage parameters or current parameters within the system for inductive power transfer, are met, wherein the standard operation is modified by either switching off one of the three phase input voltages or by modifying a phase angle of at least one of the phase input voltages.

A method of operating a three phase primary winding structure of a system for inductive power transfer to a vehicle is proposed.

The present invention can be applied to any land vehicle (including but not preferably, any vehicle which is only temporarily on land), in particular track-bound vehicles, such as rail vehicles (e.g. trams), but also to road automobiles, such as individual (private) passenger cars or public transport vehicles (e.g. busses including trolley busses which are also track-bound vehicles).

The inductive power transfer system can be operated with a predetermined operating frequency, in particular in the range from 20 kHz to 300 kHz. This does, however, not exclude the choice of a higher or lower operating frequency. The operating frequency can be chosen depending on a desired (maximum) power to be transferred by the inductive power transfer system. The desired power to be transferred can e.g. be chosen up to 500 kW. The desired power can correspond to a power provided at an output of the secondary unit, e.g. a power provided to a secondary-sided battery.

The primary winding structure comprises a first phase line, a second phase line and a third phase line. The geometric design and geometric arrangement of the phase lines can be chosen according to requirements of the planned application.

Preferably, each phase line can be designed such that a course of the phase line provides a number of sub-windings which are arranged adjacent to each other. In this context, a sub-winding denotes a, preferably complete, conductor loop which encloses a predetermined area. The conductor loop can provide or comprise one turn or multiple turns of the respective sub-winding. Adjacent to each other means that central axes of said sub-windings, in particular the axes of symmetry, are spaced apart from another, e.g. with a predetermined distance, along a common straight line. The straight line can correspond to a direction of extension of the phase line. Each phase line can provide an even or an uneven number of said sub-windings. The sub-windings can have a rectangular shape. However, it is also possible that the sub-winding has another geometric shape, e.g. a circular geometric shape.

Neighboring, i.e. adjacent, sub-windings can be counter-oriented. In this context counter-oriented means that a current flow in a first sub-winding is oriented clockwise, wherein the current flow in the neighboring second sub-winding is oriented counter-clockwise. The clockwise direction can be defined with respect to the parallel central axes which point into the same direction. If a current flows through the set of sub-windings, the neighboring sub-windings will generate a magnetic field with a magnitude proportional to their number of turns, in particular with the same magnitude, but oriented in opposite directions.

Such a design of phase line of a primary winding structure is proposed in GB 1306403.5 (not yet published).

Furthermore, the phase line can be designed such that a predetermined number of poles is provided. Referring to the aforementioned design of the phase line, each sub-winding can provide one pole of the phase line.

The phase lines can also be arranged with a predetermined distance to each other such that a desired course of the electromagnetic field is produced if the primary winding structure is operated. In particular, the phase lines can be arranged with a distance which corresponds to ⅔ of the width of the pole pitch provided by the phase lines. If the phase line comprises two or more sub-windings, a central axis of the first sub-winding of a first phase line can be arranged with a predetermined distance along the direction of extension, e.g. a common direction of extension, from the central axis of the first sub-winding of the second phase line, wherein said central axis of the second phase line can be arranged with a predetermined distance along the direction of extension from the central axis of the first sub-winding of the third phase line.

Also, each phase line can be designed such that a desired pole pitch is provided.

Preferably, the course of the phase line is 8-shaped. This means that the phase line comprises two sub-windings which are arranged adjacent to each other along the direction of extension according to the aforementioned embodiment.

Such a design of the at least one phase line advantageously allows reducing an installation space required for the primary winding structure. This, in turn, allows an even more compact design of the primary unit. The primary unit can e.g. comprise or be designed as a charging pad, wherein the charging pad can be integrated into the ground or installed on a surface of the ground (elevated charging pad). The phase lines can be integrated into the primary unit.

In a standard operational mode, a first phase input voltage, a second phase input voltage and a third phase input voltage are controlled such that a predetermined phase shift between all three phase input voltages is provided. A phase input voltage denotes a voltage which falls across an input terminal of the respective phase line and a reference potential, for example a ground potential. The phase shift can be expressed in terms of a phase angle between all three phase input voltages.

In particular, the phase shift between the first phase input voltage and the second phase input voltage can be 120° phase angle. Accordingly, the phase shift between the second phase input voltage and the third phase input voltage can be 120° phase angle. Thus, the phase shift between the first phase input voltage and the third phase input voltage is 240° phase angle. Thus, in a standard operational mode, a set of non-zero phase shift values comprises two different non-zero phase shift values, for example 120° and 240°.

In other words, a first difference voltage between the first phase input voltage and the second phase input voltage, in particular a time course of the difference voltage, is different from a second difference voltage between the second phase input voltage and the third phase input voltage which is again different from a third difference voltage between the first phase input voltage and the third phase input voltage.

According to the invention, in a modified operational mode, the first phase input voltage, the second phase input voltage and the third phase input voltage are controlled such that the set of phase shift values comprises at most two non-zero values and all non-zero phase shift values are equal.

The set of phase shift values between existing phase input voltages can comprise only one non-zero value. This e.g. means that the number of existing phase shift values is reduced to one.

Alternatively, the set of phase shift values between existing phase input voltages can comprise two non-zero values, wherein these values are equal. In this case, the remaining phase shift value can be zero. This means that the number of different non-zero phase shift values within the set of phase shift values is reduced. In this case, there are no non-zero phase shift values which are different from each other.

This means that the values of all phase shifts between the phase input voltages are either equal to a specific non-zero value or equal to zero.

In other words, only one or only two of the existing phase difference voltages are non-zero. In a first alternative, there is only one difference voltage between the phases within the modified operational mode which is non-zero. This holds especially for the case where one of the three phase lines is switched off and thus only one phase difference voltage exists. Alternatively, all three phases are supplied with a corresponding phase input voltage, wherein two of the three difference voltages are equal and one of the difference voltages is zero. This holds especially for the case, wherein the voltage course of the phase input voltages of two of the three phase input voltages are equal.

The modified operational mode can e.g. be activated depending on a geometric alignment of the primary winding structure to a secondary winding structure. This will be explained later.

Modifying the operational mode as proposed by the invention advantageously allows meeting desired power transfer criteria, especially in the case where there is a misalignment between the primary and the secondary winding structure.

It can be assumed that a reference relative position and/or orientation between the primary winding structure and the secondary winding structure exists, wherein, in the standard operational mode, the primary system is tuned at a certain operating frequency, e.g. 20 kHz, if the primary winding structure and the secondary winding structure are arranged with this reference relative position and/or orientation.

In this context, tuned can mean that no reactive power is demanded or drawn from a wayside power supply, e.g. the WPC. In the context of this invention, the WPC can denote an inverter which can also be referred to as primary-sided inverter. In a special case, tuned can mean that the phase current and the phase voltage of each phase line are in phase, at least at the first harmonic frequency of the phase input voltage/current. In other words, the operating frequency matches a resonant frequency of the electric circuit which is connected to the input terminal of the respective phase line. Said electric circuit does not only comprise primary-sided elements, but also secondary-sided elements which are transferred to the primary side.

If the primary winding structure and the secondary winding structure are arranged with this reference relative position and/or orientation, the primary unit and the secondary unit are aligned.

The alignment between the primary winding structure and the secondary winding structure can e.g. be expressed with reference to a primary-sided reference point and a secondary-sided reference point. A primary-sided reference point can e.g. be a geometric center of one of the phase lines, e.g. the first phase line. In particular, the reference point can be the geometric center of the first sub-winding of the first phase line.

A secondary-sided reference point can be a geometric center of a phase line, in particular of the first phase line, of the secondary winding structure. In particular, the reference point can be the center point of the first sub-winding of the first phase line of the secondary winding structure.

The alignment can then be expressed with respect to a primary-sided coordinate system, wherein a longitudinal axis can correspond to a direction of extension of the primary winding structure, a vertical axis can be oriented perpendicular to a plane surface in which the primary winding structure is arranged. A lateral axis can then be perpendicular to the longitudinal axis and the vertical axis.

The origin of the primary-sided coordinate system can e.g. be located at the primary-sided reference point. With respect to such a primary-sided coordinate system, a relative position and/or orientation between the primary winding structure and the secondary winding structure can be expressed.

In the case of a misalignment, e.g. a deviation from the reference relative position and/or orientation, the transformer provided by the primary side and the secondary side will detune. This, in turn, will cause a drop in the power transfer performance and increase losses on the primary side, in particular within a primary-sided inverter. To compensate for said decrease in the power transfer performance, higher currents on the primary side are required which, in turn, will generate higher losses and reduce the total power transfer efficiency.

This effect especially holds for primary units with small geometric dimensions, wherein a small misalignment will result in a significant drop of the power transfer performance. In other words, primary units with small dimensions feature a lower tolerance regarding misalignment.

It is, for instance, possible that in the case of a misalignment of the secondary winding structure, e.g. of the pick-up, a large portion of the primary winding structure, in particular a portion of a phase line of the primary winding structure, will not be covered by portion of the secondary winding structure. In the context of this invention, covered means that the primary winding structure and the secondary winding structure overlap in a common plane of projection which may be oriented perpendicular to the aforementioned vertical direction. In the case of incomplete coverage, injected energy into the primary winding structure will not contribute to the inductive energy transfer process effectively.

By activating the modified operational mode in case of a misalignment, the aforementioned disadvantages, in particular the drop in the power transfer performance and the higher currents in the primary winding structure, can advantageously be fully or at least partially compensated.

In another embodiment, one of the phase input voltages is reduced to zero.

It is important that only one of the three phase input voltages is reduced to zero. In other words, one of the three phase input voltages is switched off. The corresponding phase line is thus not operated. Thus, only two of the three input voltages exist. In this case, the set of phase shift values comprises only one value, wherein said value is a non-zero value. This effectively provides a virtual single phase system, wherein a virtual single phase line is provided between the input terminals of the operated phase lines. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Reducing one of the phase input voltages to zero is especially effective in the case of an undesired reduced air gap between the primary winding structure and the secondary winding structure. For a desired inductive power transfer, an air gap with a predetermined width, which can also be denoted as vertical displacement, needs to be provided. If the width of said air gap is reduced, e.g. due to a flat tire or a heavy load within the vehicle, extra voltages can be generated within the secondary winding structure in case of an inductive power transfer. These extra voltages can damage secondary-sided elements, e.g. the rectifier or capacitors.

By turning off one phase line, the amount of transferred energy is reduced. This, in turn, advantageously reduces or even eliminates the aforementioned extra voltages on the secondary side. Another advantage is that, compared to the standard operational mode, an input DC current to an inverter on the primary side can be reduced.

In a preferred embodiment, the remaining phase input voltages are controlled such that the non-zero phase shift value is 180°. If e.g. the second phase line is turned off, the phase angle of the third phase input voltage can be increased by 60° which provides a phase shift between the first and the third phase input voltage of 180°. By adjusting the phase shift to 180°, a higher AC voltage falls across the input terminals of the remaining phase lines. Said AC voltage can e.g. be applied to a current-shaping filter on the primary side which generates a higher current in the primary winding structure. This higher current advantageously increases the inductive energy transfer to the secondary side. However, the DC input voltage for primary-sided inverter is not increased.

In an alternative embodiment, two of the three phase input voltages are controlled such that their respective voltage curves are equal. This means that time courses of the phase input voltages are equal. In other words, the phase angle between each of these two (controlled) phase input voltages and the remaining phase input voltage is equal.

Controlling the phase input voltages can be done by controlling the phase angles of the phase input voltages. This means that the phase angles of two of the three phase input voltages are controlled such that their respective voltage curves are equal.

In this case, the set of phase shift values can still comprise three values, wherein one value is zero and the remaining two values are equal and non-zero.

Such a control also provides a virtual single phase system. If e.g. the voltage curves of the second and the third phase input voltages are equal, the virtual single phase line is provided between the input terminal of the first phase line and the input terminals of the third and the second phase line which have the same potential. As will be explained later, such a virtual single phase system advantageously allows varying the operating frequency of the voltage falling across the terminals of the virtual single phase line in order to e.g. match a resonant frequency of said virtual single phase line. This, in turn, reduces a reactive power and thus increases the inductive power transfer performance.

Controlling two of the three phase input voltages such that their respective voltage curves are equal can e.g. increase the current within a phase line providing a fully covered section of primary winding structure, wherein currents in a phase line providing a partially-exposed section of the primary winding structure will be reduced. By reducing the current in the phase lines providing partially-exposed sections of the primary side winding structure, the amount of conduction loss within these sections of the primary side winding structure will reduce advantageously. By a higher current in the phase line providing the fully-covered primary side windings, the range of acceptable misalignments will be advantageously expanded.

In total, by activating the modified operational mode, the amount of transferred energy is distributed among the phase lines such that the most effective power transfer is provided. Especially in the case of a misalignment between the primary side winding structure and the secondary side winding structure, the primary-sided phase lines will be detuned. This is e.g. due to an increase stray inductance which is provided by the misalignment. The detuning will result in a capacitive or inductive reactance which, in turn, can lead to the effect that the phase current and phase voltage are not in phase anymore. Thus, additional reactive power has to be provided by an inverter and there is no possibility of zero current switching or zero voltage switching anymore. In case of such a detuning due to misalignment, no common frequency for the phase input voltages can be found which will compensate the detuning effect and provide a system which can be operated in a tuned state. The proposed modified operational mode overcomes this problem by creating the aforementioned virtual single phase line.

In a preferred embodiment, the phase angle of at least one of the two phase input voltages is shifted by a multiple of +/−60°.

This advantageously allows an easy control of the two phase input voltages in order to achieve equal voltage curves.

It is possible to control the remaining phase input voltages such that the non-zero phase shift value takes a desired value which can also be different from 180°. As the voltage, in particular an amplitude of the voltage, provided at the terminals of the secondary winding structure of the transformer, depends on the phase shift value, said voltage can be controlled depending on the non-zero phase shift value. However, a non-zero phase shift value different from 180° can inhibit a zero current switching of switching elements of the WPC. Switching losses in the WPC can occur if a non-zero phase shift value different from 180° is chosen, even if no reactive power is drawn from the wayside power supply.

In a preferred embodiment, a frequency of at least one, preferably of all, phase input voltage(s) is/are varied. In particular, the frequencies of all remaining phase input voltages can be varied by the same amount. Furthermore, the frequencies can be varied such that a reactance of the resulting virtual single phase line is reduced. This advantageously increases the power transfer efficiency.

In a preferred embodiment, the frequency/frequencies of the (remaining) phase input voltage(s) is/are adapted to a resonant frequency of a virtual single phase line, wherein the virtual single phase line is provided between the input terminals of the phase input voltages which provide the non-zero phase shift value (in the case where one phase line is turned off) or which provide the equal non-zero phase shift values (in the case where two of the three phase input voltages are controlled such that their respective voltage curves are equal).

In the case where one of the phase lines are turned off, the virtual single phase line is provided between the input terminals of the remaining two active phase lines.

In the case where two of the three phase input voltages are controlled such that their respective voltage curves are equal, the virtual single phase line is provided between the input terminal of the remaining single phase line and the input terminals of the two phase lines with equal voltage curves and thus a common potential.

In the case of such an adapted frequency, the reactance of the virtual single phase line is zero. This means that any detuning can be compensated for by reference frequency adaption. Hence, the detuned three phase system is transferred to a tuned single phase system. Within the tuned single phase system, no reactive power has to be provided by the inverter. Also, zero voltage switching of switching elements within the inverter can be provided.

In another embodiment, phase input voltages are controlled such that a predetermined secondary output power is provided. The secondary output power can denote the charging power which is provided to a secondary-sided energy reservoir such as a traction battery. Said predetermined secondary output power can e.g. be 7.2 kW. Hence, a control scenario has to be found which ensures that the demanded secondary output power is always provided.

This advantageously guarantees the desired transfer of inductive energy even in the case of misalignment.

In another embodiment, the phase input voltages are controlled such that a current-voltage-curve of each of the phase lines is of non-capacitive character. This advantageously prohibits capacitive switching in one of the legs of a primary-sided inverter which, in turn, can generate heavy switching losses. The non-capacitive switching is also essential for minimizing the ratings of primary-sided power devices and for minimizing the requirements for a cooling system.

Thus, providing a non-capacitive current-voltage-curve advantageously overcomes the aforementioned disadvantages.

In another embodiment, the phase input voltages are controlled such that a maximal DC primary-sided input voltage, in particular of the primary-sided inverter, is smaller than or equal to a predefined threshold value. This means that the maximal limit of a required DC input voltage for providing a desired secondary output power can be reduced.

In yet another embodiment, the phase input voltages are controlled such that phase currents are minimized. This advantageously decreases resistive losses within the phase lines.

It is, for instance, possible that if the modified operational mode is activated, different control scenarios of the modified operational mode of the phase input voltages are subsequently activated for a predetermined amount of time. Then, the control scenario which meets all or the most of the aforementioned criteria can be chosen. Alternatively, characteristics of the phase input voltages, e.g. an amplitude and a phase angle, can be adapted such that one or more, preferably all, of the aforementioned criteria are met.

In another embodiment, the first, the second and the third phase input voltage are provided by a three-phase inverter. Switching states of the switching elements, e.g. MOSFETs or IGBTs, of the inverter are controlled such that the desired first phase input voltage, the desired second phase input voltage and the desired third phase input voltage, in particular desired time courses of said input voltages, are provided. The inverter can be a three leg inverter, wherein each leg comprises a first switching element connected to a high potential and a second switching element connected to a low potential. Switching elements within one of the legs can be connected at a common potential which provides a potential of an input terminal of one phase line.

In this case, control scenario within the modified operational mode can be provided by a switching pattern of the switching elements of the inverter.

In other words, a switching pattern can be applied that fulfils the aforementioned criteria, e.g. providing desired secondary output power, avoiding capacitive switching and providing a minimal range of a DC input voltage.

In another embodiment, the control of the first, the second and the third phase input voltage is adapted to a geometric alignment of the primary winding structure and a secondary winding structure. This means that a certain control scenario of the phase input voltages can be activated depending on a geometric alignment.

It is, for instance, possible that a relative position and/or orientation of the primary and secondary winding structure is determined, e.g. measured. This can e.g. be performed by using at least one sensor element. Depending on the relative position and/or orientation, an alignment status can be determined, e.g. if the winding structures are aligned or misaligned. It is, of course, also possible to determine the (mis)alignment quantitatively. An adequate control scenario of the phase input voltages can be activated depending on the alignment status or the quantitative value.

It is of course also possible to activate a certain control scenario of the phase input voltages depending on an alignment status or a determined relative position and/or orientation. For instance, a calibration process can be performed, wherein for certain alignment status or relative position and/or orientation, the optimal control scenario, e.g. switching pattern, is determined. In the field, at a later point in time, the alignment status or the relative position and/or orientation can be determined and the corresponding control scenario can be activated in the modified operational state.

Further proposed is a primary unit of a system for inductive power transfer, wherein the primary unit comprises a three phase primary winding structure with a first phase line, a second phase line and a third phase line. The primary unit further comprises at least one control unit for controlling a first phase input voltage, a second phase input voltage and a third phase input voltage. In a standard operational mode, the first phase input voltage, the second phase input voltage and the third phase input voltage are controllable such that the predetermined phase shift between all three phase input voltages is provided. Within the standard operational mode, the number of different non-zero phase shift values can be three.

According to the invention, in a modified operational mode, the first phase input voltage, the second phase input voltage and the third phase input voltage are controllable such that the set of phase shift values comprises at most two none-zero values and all non-zero phase shift values are equal.

With the proposed primary unit, one of the previously described methods can advantageously be performed.

In another embodiment, the primary unit comprises a three-phase inverter, wherein the first, the second and the third phase input voltage are providable by the three-phase inverter, wherein switching states of the switching elements of the inverter are controllable such that the desired first phase input voltage, the desired second phase input voltage and the desired third phase input voltage is provided.

BRIEF DESCRIPTION OF THE DRAWINGS

The invention will be described with reference to the attached figures. The figures show.

DESCRIPTION OF THE INVENTION

Figure 1:
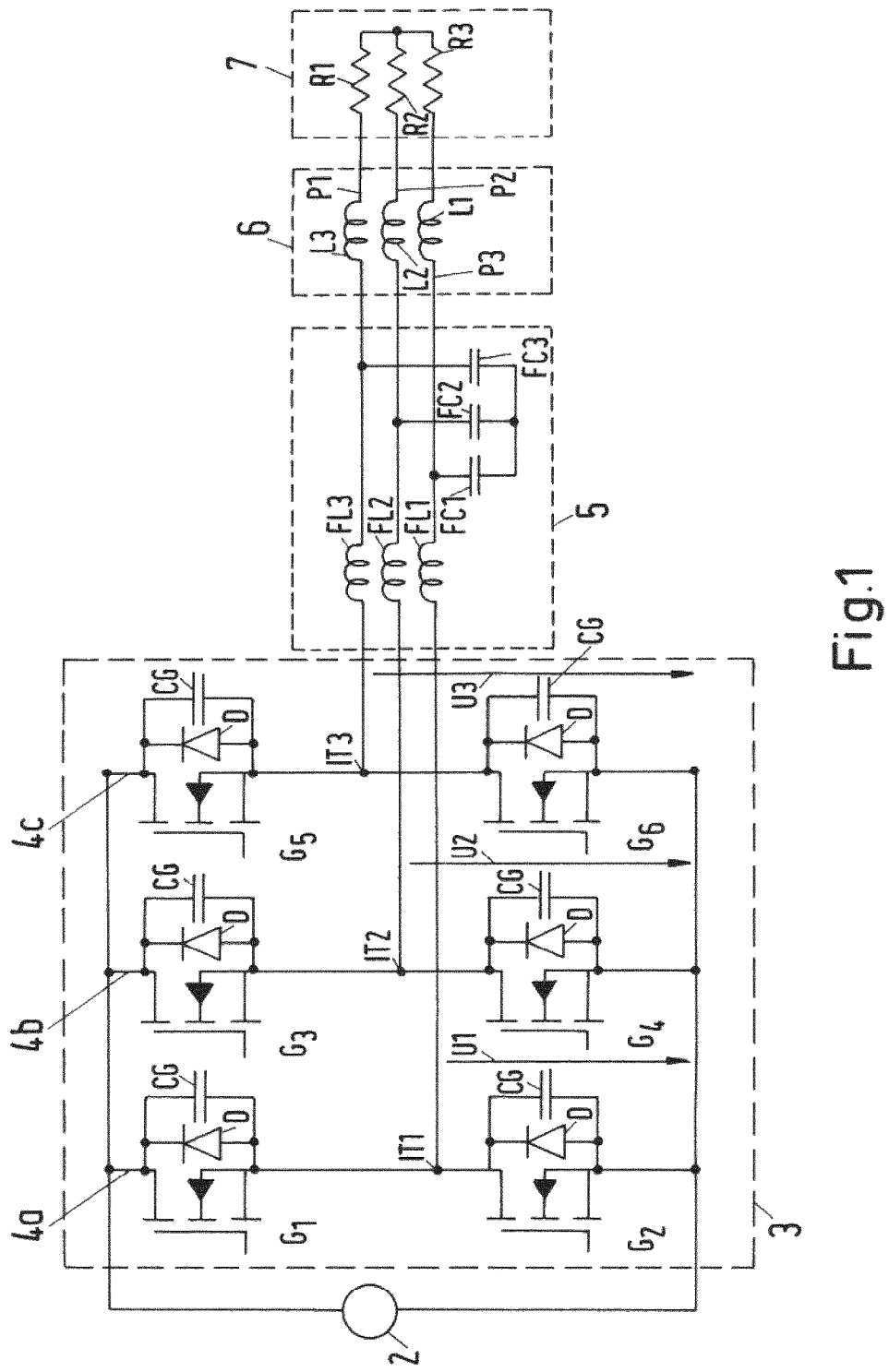
FIG. 1 a schematic circuit diagram of a primary unit of a system for inductive power transfer, FIG. 2 an exemplary side view of a vehicle located above a primary unit, FIG. 3 an exemplary time course of gate signals and currents in the standard operational mode, FIG. 4 an exemplary time course of gate signals and currents in a first control scenario of the modified operational mode and FIG. 5 an exemplary time course of gate signals and currents in another control scenario of the modified operational mode.
Figure 2:
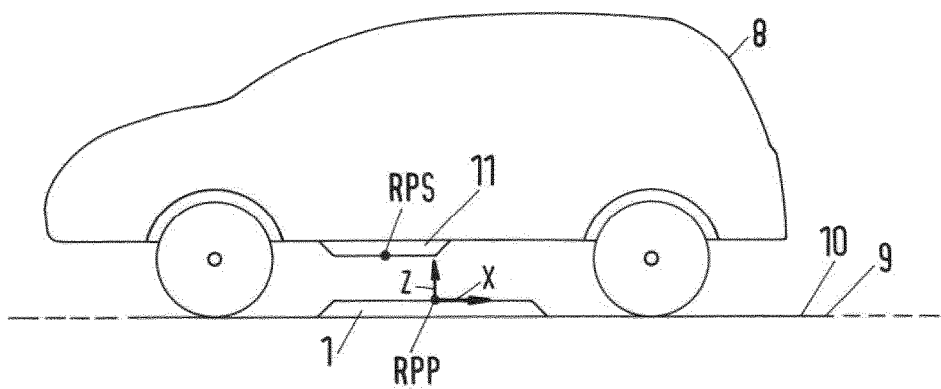

FIG. 1 shows a schematic circuit diagram of a primary unit 1 (see FIG. 2). The primary unit 1 comprises a DC voltage source 2 which provides a DC input voltage to an inverter 3. The inverter comprises three legs 4a, 4b, 4c.

The first leg 4a comprises a first switching element $G_1$ and a second switching element $G_2$. An input terminal of the first switching element $G_1$ is connected to a high potential provided by the DC voltage source 2. A second terminal of the first switching element $G_1$ is connected to a first terminal of the second switching element $G_2$. A second terminal of the second switching element $G_2$ is electrically connected to a low potential provided by the DC voltage source 2. A common connection point of the first and the second switching element $G_1$, $G_2$ also provides an input terminal IT1 of a first phase line P1.

The remaining two legs 4b, 4c of the inverter 3 are designed correspondingly. In particular, the second leg 4b of the inverter 3 comprises a first switching element $G_3$ and a second switching element $G_4$ which are connected in the same way as the switching elements $G_1$, $G_2$ of the first leg 4a. A common connection point of the first switching element $G_3$ and the second switching element $G_4$ of the second leg 4b provides an input terminal IT2 of a second phase line P2.

The third leg 4c comprises a first switching element $G_5$ and a second switching element $G_6$ which are designed and arranged correspondingly to the switching elements $G_1$, $G_2$ of the first leg 4a. A common connection point of the first switching element $G_5$ and the second switching element $G_6$ of the third leg 4c provides an input terminal IT3 of a third phase line P3.

To each switching element $G_1$, $G_2$, $G_3$, $G_4$, $G_5$, $G_6$, a freewheeling diode D and a switch capacitor CG is connected in parallel.

The primary unit 1 further comprises a current-shaping filter 5. The current-shaping filter 5 comprises inductive filter elements FL1, FL2, FL3 and capacitive filter elements FC1, FC2, FC3, one per phase line. Within each phase line P1, P2, P3, the inductive filter elements FL1, FL2, FL3 of the current-shaping filter 5 are connected in series to the respective input terminal IT1, IT2, IT3 of each phase line P1, P2, P3. Further, within each phase line, the respective capacitive filter elements FC1, FC2, FC3 are connected to the inductive filter elements FL1, FL2, FL3 and to a series connection of an inductive element L1, L2, L3 of a primary winding structure 6 and a resistive element R1, R2, R3 of a resistive structure 7.

The current-shaping filter 5 is used to tune the primary unit 1.

The primary unit 1 further comprises the primary winding structure 6. The primary winding structure 6 comprises one inductive element L1, L2, L3 per phase line P1, P2, P3.

These inductive elements L1, L2, L3 are connected in series to the current-shaping filter 5, in particular to the inductive filter elements FL1, FL2, FL3. An inductive element L1, L2, L3 represents an inductance of a winding structure of the corresponding phase line P1, P2, P3 for generating the alternating electromagnetic field for inductive power transfer.

Further shown is a resistive structure 7 of the primary unit 1 which comprises resistive elements R1, R2, R3. These resistive elements R1, R2, R3 represent a resistance of each phase line P1, P2, P3.

A control unit (not shown) controls the switching elements $G_1, \ldots, G_6$ of each leg 4a, 4b, 4c of the inverter 3, in particular switching times of each switching element $G_1, \ldots, G_6$. By controlling the switching times, in particular the points in time at which a switching element $G_1, \ldots, G_6$ is opened or closed, a desired voltage course of a phase input voltage U1, U2, U3 can be provided for each phase line P1, P2, P3. By controlling the switching times, also an amplitude and a frequency of the phase input voltages U1, U2, U3 and a phase shift between the phase input voltages U1, U2, U3 can be controlled.

FIG. 2 shows a schematic side view of a vehicle 8 which travels along a surface 9 of a route 10. On the surface 9, a primary unit 1 is installed. The primary unit 1 can e.g. be designed as an elevated charging pad. Alternatively, the primary unit 1 can be integrated into the ground providing the route surface 9. The vehicle 8 comprises a secondary unit 11 which can be also referred to as receiving device or pick-up.

Shown is a reference point RPP of the primary unit 1 which is stationary with respect to the primary unit 1. Further shown is a reference point RPS of the secondary unit 11 which is stationary with respect to the secondary unit 11. Further shown is a longitudinal axis x and a vertical axis z of a reference coordinate system which is originated in the reference point RPP in the primary unit 1. The longitudinal axis x is directed into a longitudinal direction. This longitudinal direction can e.g. be a direction of travel if the vehicle travels straight forward on the surface 9 of the route 10. The vertical axis z is oriented perpendicular to the surface 9 of the route 10. A lateral axis (not shown) is oriented perpendicular to the shown longitudinal and vertical axes x, z. With respect to the reference coordinate system, a longitudinal and a vertical displacement is provided between the reference points RPP, RPS of the primary and secondary unit 1, 11 respectively. Not shown is a lateral displacement.

In a reference relative position and/or orientation of the primary unit 1 and the secondary unit 11, the transformer provided by the electric elements of the primary unit 1 and the secondary unit 11, in particular by the primary winding structure 6 (see FIG. 1) and a secondary winding structure (not shown), is tuned.

This means that for a predetermined reference longitudinal, lateral and/or vertical displacement and, if applicable for a predetermined reference relative orientation, the inverter 3 can be operated at a predetermined operating frequency, wherein no reactive power has to be provided or compensated by the inverter 3. Operating the inverter 3 at the predetermined frequency can mean that a switching state of switching elements $G_1, \ldots, G_6$ can be changed with said operating frequency. Thus, the phase input voltages U1, U2, U3 or at least a first harmonic of said phase input voltages U1, U2, U3 have said operating frequency.

In other words, in this predetermined reference relative position and/or orientation, a resonant frequency of a circuit structure connected to the input terminals IT1, IT2, IT3 of each leg 4a, 4b, 4c matches the operating frequency. It is important to note that the aforementioned circuit structure connected to the input terminals IT1, IT2, IT3 does not only comprise the primary-sided elements shown in FIG. 1 but also secondary-sided elements, wherein inductances, capacitances and/or resistances of said secondary-sided elements are transferred to the primary side, wherein these transferred elements are also part of the circuit structure.

Figure 3:
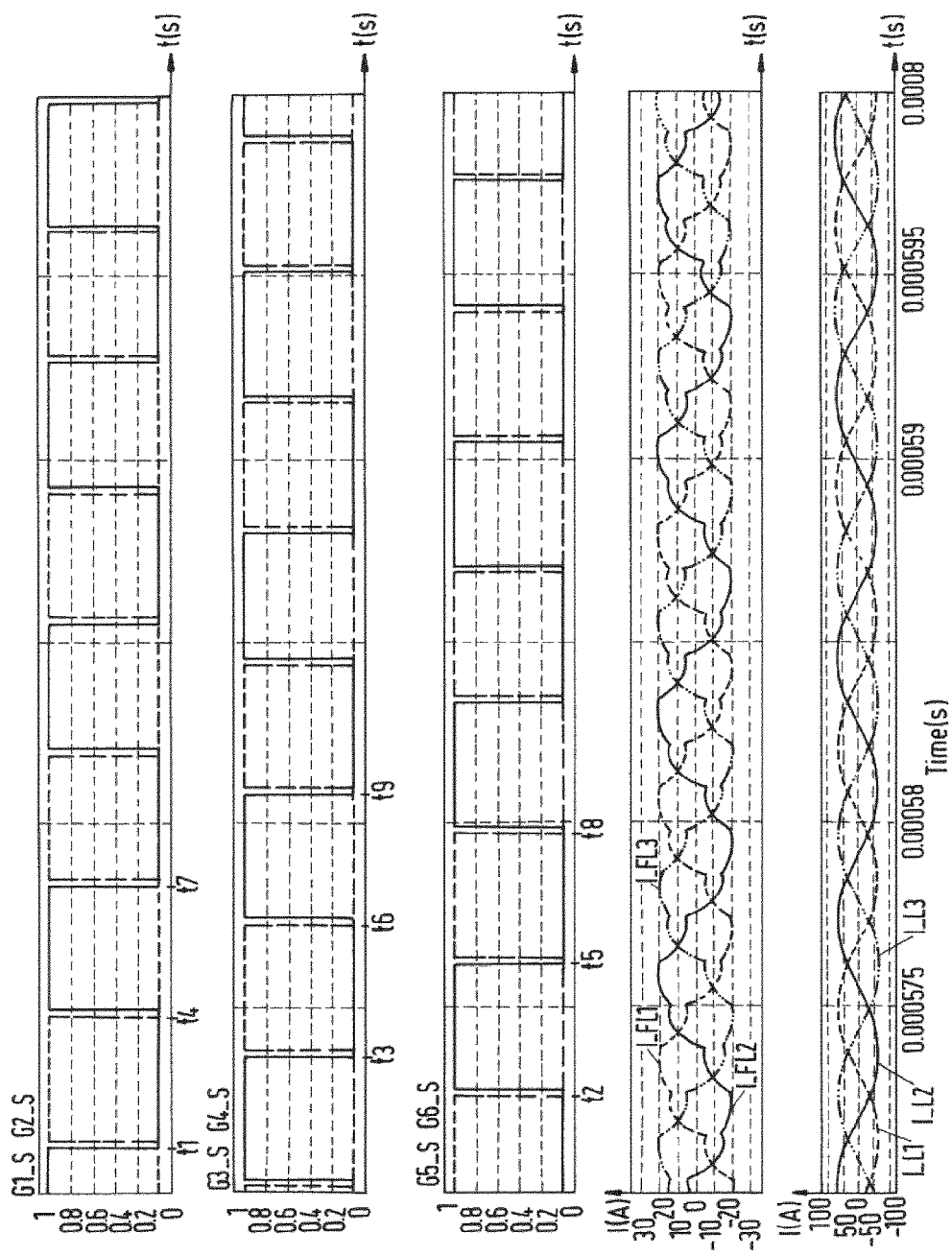

FIG. 3 shows exemplary time courses of gate signals G1_S, G2_S, G3_S, G4_S, G5_S, G6_S of the switching element $G_1, \ldots, G_6$ shown in FIG. 1. If the respective gate signal G1_S, . . . , G6_S corresponds to a value of 1, the respective switching element $G_1, \ldots, G_6$ is closed. If the value of the respective gate signal G1_S, . . . , G6_S corresponds to a value of 0, the respective switching element $G_1, \ldots, G_6$ is opened. At a first switching time instant t1, the second switching element $G_2$ of the first leg 4a is switched off and the first switching element $G_1$ of the first leg 4a is switched on. After the first switching time instant t1, the DC input voltage provided by the DC voltage source 2 is applied to the input terminal IT1 of the first phase line P1.

At a second switching instant t2, the first switching element $G_5$ of the third leg 4c is switched off. Within a predetermined time lag after this switching off time instant, the second switching element $G_6$ of the third leg 4c is switched on.

At a third switching time instant t3, the second switching element $G_4$ of the second leg 4b is switched off. A predetermined time leg after that switching off instant, the first switching element $G_3$ of the second leg 4b is switched on.

At a fourth switching time instant t4, the first switching element $G_1$ of the first leg 4a is switched off and the second switching element $G_2$ of the first leg 4a is switched on. At a fifth switching time instant t5, the second switching element $G_6$ of the third leg 4c is switched off and the first switching element $G_5$ of the third leg 4c is switched on. At a sixth switching time instant t6, the first switching element $G_3$ of the second leg 4b is switched off and the second switching element $G_4$ of the second leg 4b is switched on. At a seventh switching time instant t7 one switching period of the first phase line P1 has passed.

Correspondingly, one switching period of the third phase line P3 has passed at an eighth switching time instant t8 and a switching period of the second phase line P2 has passed at a ninth switching time instant t9.

It is shown that the predetermined time lag is arranged in between all switching-off and the switching-on time instants shown in FIG. 3.

Thus, the phase input voltages U1, U2, U3 have a square-wave form.

A phase angle between the first phase input voltage U1 and a second phase input voltage U2 is shown by the time lag between the third switching time instant t3 and the first switching time instant t1. The phase shift between the first phase input voltage U1 and the third phase input voltage U3 is provided by the time lag between the first switching time instant t1 and the fifth switching time instant t5. The phase shift between the second phase input voltage U2 and the third phase input voltage U3 is provided by the time lag between the third switching time instant t3 and the fifth switching time instant t3.

It can be seen that the phase shift between the first and the second phase input voltages U1, U2 is equal to the phase shift between the second and the third phase input voltages U2, U3 and non-zero, in particular 120°. Further, the phase shift between the first and the third phase input voltage U1, U3 corresponds to the double value of the phase shift between the first and the second phase input voltage U1, U2, e.g. to 240°. Thus, the set of phase shift values comprises three non-zero values.

FIG. 3 shows the time courses for standard operational mode. Further shown are currents I_FL1, I_FL2, I_FL3 which flow through the inductive filter elements FL1, FL2, FL3 of the current-shaping filter 5. Further shown is a time course of winding currents I_L1, I_L2, I_L3 which flow through the inductive elements L1, L2, L3, e.g. the winding structures, of primary winding structure 6.

In the standard operational mode, the currents I_L1, I_L2, I_L3 have a sinusoidal form and have phase shifts of 120° or 240°.

Figure 4:
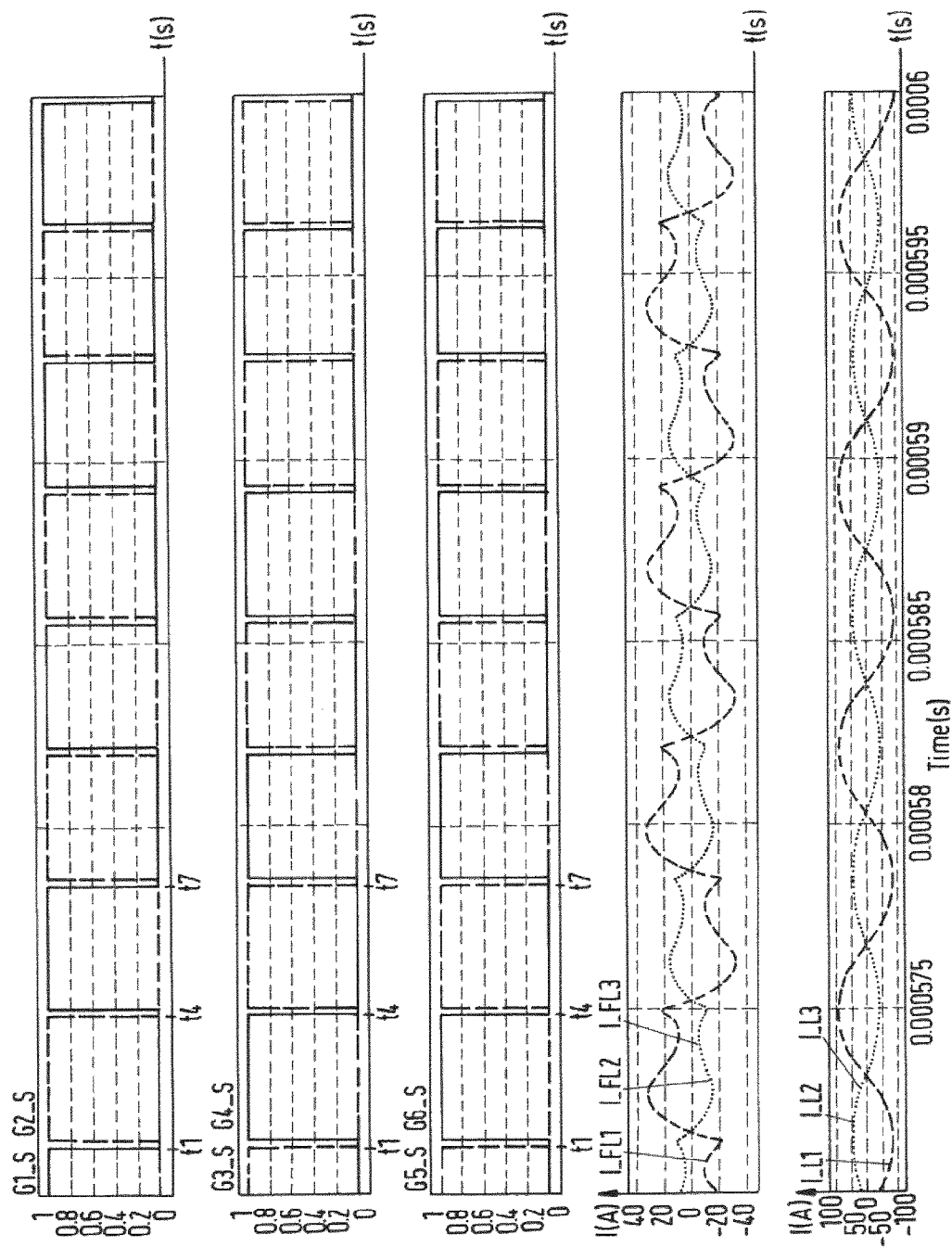

FIG. 4 shows exemplary time courses of gate signals G1_S, G2_S, G3_S, G4_S, G5_S, G6_S. The time course of the gate signals G1_S, G2_S of the first leg 4a (see FIG. 1) equals to the time course shown in FIG. 3.

However, the time courses of the gate signals G3_S, G4_S for the switching elements $G_3$, $G_4$ of the second leg 4b are shifted by −60° with respect to the time course of the gate signals G3_S, G4_S shown in FIG. 3. This means that the second switching element $G_4$ of the second leg 4b is switched off at fourth time instant t4 and not at the third time instant t3 as shown in FIG. 3.

Also, time courses of the gate signals G5_S, G6_S of the switching elements $G_5$, $G_6$ of the third leg 4c are shifted by +60° with respect to the time course of the gate signals G5_S, G6_S shown in FIG. 3. This means that the time course of the gate signals G5_S, G6_S of the switching elements $G_5$, $G_6$ of the third leg 4c equals to the time course of the gate signals G3_S, G4_S of the switching elements $G_3$, $G_4$ of the second leg 4b. This, in turn, means that voltage curves of the second and the third input voltage U2, U3 are equal.

The switching pattern shown in FIG. 4 can be applied in particular if there is a misalignment between the primary unit 1 and the secondary unit 11 shown in FIG. 2. A misalignment can be provided if the relative position and/or orientation between the primary unit 1 and the secondary unit 11 deviates from the reference relative position and/orientation.

Further shown are the filter currents I_FL1, I_FL2, I_FL3 and the winding currents I_L1, I_L2, I_L3. As stated before, the filter and winding currents I_FL2, I_FL3, I_L2, I_L3 of the second and the third phase are equal to each other.

Compared to the time course of the winding currents I_L1, I_L2, I_L3 shown in FIG. 3, it can be seen that a maximal amplitude of the winding current I_L1 through the inductive element L1 of the winding structure 6 in the first phase line P1 has increased. In contrast, the winding currents I_L2, I_L3, e.g. a maximal amplitude, have decreased. Illustratively, a higher amount of power is transferred by the inductive element L1 of the winding structure 6 in the first phase line P1, wherein less power is transferred by the inductive elements L2, L3 of the winding structure 6 in the remaining phase lines P2, P3. This can e.g. be the case if the section of the primary side winding structure 6 provided by the inductive element L3 in the third phase line P3 is only partially covered by the secondary winding structure of the secondary unit 11.

Figure 5:
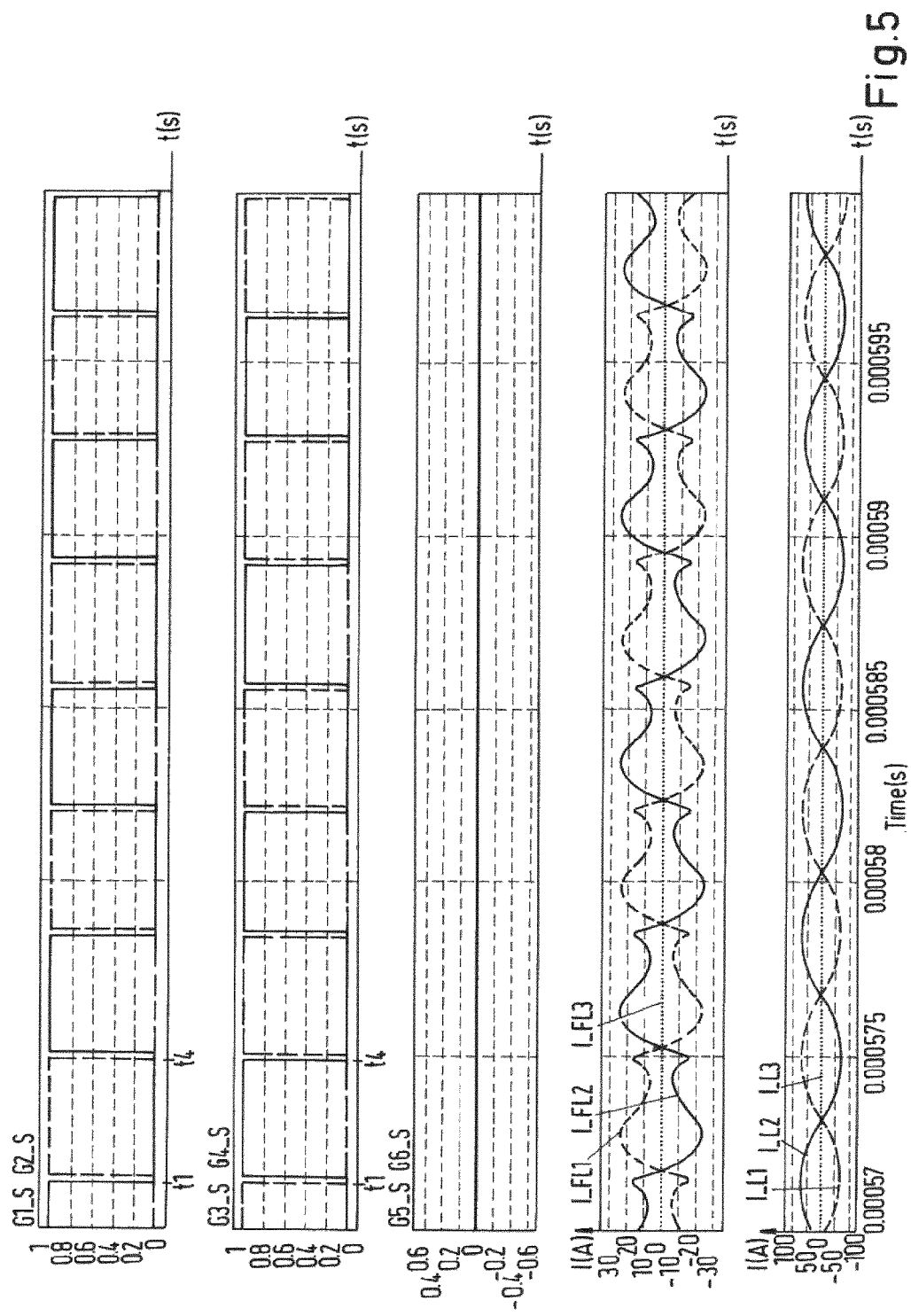

FIG. 5 shows exemplary time courses of gate signals G1_S, . . . , G6_S. In the switching pattern shown in FIG. 5, the time course of the gate signals G1_S, G2_S of the first and the second switching element $G_1$, $G_2$ of the first leg 4a corresponds to the time course shown in FIG. 3. Also, the time course of the gate signals G3_S, G4_S of the switching elements $G_3$, $G_4$ of the second leg 4b corresponds to the time course shown in FIG. 4. This means that the time course is shifted by −60° with respect to the time course of the gate signals G3_S, G4_S shown in FIG. 3.

The switching elements $G_5$, $G_6$ of the third leg 4c are turned off. This means that the third phase input voltage U3 is reduced to zero.

Also shown are filter currents I_FL1, I_FL2, I_FL3 and winding currents I_L1, I_L2, I_L3. The filter current I_FL3 and the winding current I_L3 of the third phase line P3 are zero. It is shown that the winding currents I_L1, I_L2 have a phase shift of 180° and their maximal amplitude is increased if compared to the maximal amplitude of the corresponding winding currents I_L1, I_L2 shown in FIG. 3. Illustratively, a larger amount of power is transferred by the inductive elements L1, L2 of the winding structure 6 in the first and the second phase line P1, P2, wherein no power is transferred by the inductive element L3 of the winding structure 6 in the third phase line P3. Such a switching pattern can e.g. be applied if there is a vertical misalignment of the primary and the secondary unit 1, 11, in particular if the vertical distance of the difference relative position is decreased.

Simulations have been performed for different misalignment scenarios. Within all misalignment scenarios, different criteria of the inductive power transfer have been analyzed. A first criteria has been fulfilled if a secondary output power has been equal to 7.2 kW. A second criteria has been fulfilled if non-capacitive switching has been provided at the switching time instances t1, . . . , t9 (see FIG. 3, FIG. 4, FIG. 5).

The proposed method can advantageously be implemented without changing a hardware configuration of an existing system of inductive power transfer, e.g. by a software update. There is no need to add any passive or active components to the wayside or the vehicle. Also, there is no need to change the ratings of existing components. In fact, it is even possible to select the smaller ratings or use the same components with lower stress.

The aforementioned non-capacitive switching can be essential for minimizing the ratings of the components and also reduces a required cooling effort. In order to obtain the non-capacitive switching, the phase current in a phase line P1, P2, P3 corresponding to a positive gate signal of a switching element $G_1$, . . . , $G_6$ assigned to the phase line P1, P2, P3 can be less than predetermined value.

Simulations have shown that there always exists a switching pattern that fulfills the requirements for non-capacitive switching, i.e. switching with non-capacitive character, for any alignment scenario. It has also been shown that an adapted switching pattern exists, wherein a RMS-value of phase currents on the primary side are significantly lower when compared to a symmetrical three-phase switching. These lower phase currents are obtained with no compromise in the power transfer capability. This, in turn, helps to minimize the primary losses toward higher efficiencies.

Simulations have further shown that currents passing via the current-shaping filter 5 can be considerably lower using an adapted switching pattern compared to the currents in a symmetrical three-phase switching. This means that the loss in the equivalent series resistor of said capacitors is reduced considerably. Also, voltages falling across the capacitors of the current-shaping filter 5 can be considerable lower using an adapted switching pattern compared to the voltages in a symmetrical three-phase switching.

Simulations have further shown that the required range for the DC input voltage can be reduced using an adapted switching patterns compared to the symmetrical three-phase switching. This means that for every position and/or orientation of the secondary winding structure relative to the primary winding structure, there is a possibility to choose an adapted switching pattern to gain adequate power transfer with an acceptable value of DC input voltage. This provides a high controllability (especially in the case when the DC input voltage is not close to the limits) while the zero voltage switching features and higher efficiency are maintained.

Also shown is that electromagnetic emissions are not increased considerably by changing a switching pattern.

A large ratio of an air gap to a pole pitch can cause the coupling between the primary winding structure and secondary winding structure to change as a function of vertical and horizontal displacement in a very high degree, especially in the case of a geometrical short primary winding structure. Thus, even if voltages and currents can be brought to symmetry using additional means, any displacement between the primary and secondary winding structure can lead to detuning. By adapting the switching pattern, a most favorable pattern can be found, for example by examining one switching pattern after the other. The resulting switching pattern can allow achieving desirable features for the inductive power transfer system while fulfilling demanded requirements. Losses can be reduced by using an adapted switching pattern. In total, the system can be designed lighter, less expensive and more reliable.

The invention claimed is:

1. A method of operating a three phase primary winding structure of a system for inductive power transfer, the method comprising:
   providing a primary winding structure comprising a first phase line, a second phase line and a third phase line;
   controlling, with a control unit and in a standard operational mode, a first phase input voltage, a second phase input voltage and a third phase input voltage such that a predetermined phase shift value between all three phase input voltages is provided; and
   controlling, with the control unit and in a modified operational mode, the first phase input voltage, the second phase input voltage and the third phase input voltage such that a set of phase shift values comprises at most two non-zero values and all non-zero phase shift values are equal,
   wherein controlling the first phase input voltage, the second phase input voltage, and the third phase input voltage in the modified operational mode comprises:
   reducing one of the first phase input voltage, the second phase input voltage, or the third phase input voltage to zero; and
   adjusting a phase shift value between the phase input voltages that are not reduced to zero;
   generating a current in the primary winding structure that is greater than a current in the primary winding structure during the standard operational mode.

2. The method according to claim 1, wherein reducing one of the first phase input voltage, the second phase input voltage, or the third phase input voltage to zero comprises:
   switching off one of the first phase input voltage, the second phase input voltage, or the third phase input voltage to zero.

3. The method according to claim 2, further comprising controlling the phase input voltages that are not reduced to zero such that the non-zero phase shift value is 180° phase angle.

4. The method according to claim 1, further comprising controlling two of the three phase input voltages such that their respective voltage curves are equal.

5. The method according to claim 4, further comprising shifting a phase angle of at least one of the two phase input voltages that are not reduced to zero by a multiple of +/−60° phase angle.

6. The method of claim 1, further comprising varying a frequency of at least one phase input voltage.

7. The method of claim 1, further comprising controlling the phase input voltages such that a predetermined secondary output power is provided.

8. The method of claim 1, further comprising controlling the phase input voltages such that a current-voltage-curve of each of the phase lines is of non-capacitive character.

9. The method of claim 1, further comprising controlling the phase input voltages such that a maximal DC primary-sided input voltage is smaller than or equal to a predefined threshold value.

10. The method of claim 1, further comprising controlling the phase input voltages such that phase currents are minimized.

11. The method of claim 1, further comprising controlling the first, the second and the third phase input voltage by a three-phase inverter; and controlling switching states of the switching elements of the inverter such that the desired first phase input voltage, the desired second phase input voltage and the desired third phase input voltage is provided.

12. The method of claim 1, further comprising adapting the control of the first, the second and the third phase input voltage to a geometric alignment of the primary winding structure and a secondary winding structure.

13. A primary unit of a system for inductive power transfer, wherein the primary unit comprises a three phase primary winding structure with a first phase line, a second phase line and a third phase line, wherein the primary unit further comprises:
   at least one control unit for controlling a first phase input voltage, a second phase input voltage and a third phase input voltage; and
   wherein in a standard operational mode the first phase input voltage, the second phase input voltage and the third phase input voltage are controllable such that a predetermined phase shift between all three phase input voltages is provided; and
   wherein in a modified operational mode the first phase input voltage, the second phase input voltage and the third phase input voltage are controllable such that the set of phase shift values comprises at most two non-zero values and all non-zero phase shift values are equal;
   wherein in the modified operational mode, the control unit reduces one of the first phase input voltage, the second phase input voltage, or the third phase input voltage to zero, adjusts a phase shift value between the phase input voltages that are not reduced to zero, and causes a current to be generated in the primary winding structure that is greater than a current in the primary winding structure during the standard operational mode.

14. The primary unit according to claim 13, wherein the primary unit comprises a three-phase inverter, wherein the first, the second and the third phase input voltage are providable by the three-phase inverter, wherein switching states of the switching elements of the inverter are controllable such that the desired first phase input voltage, the desired second phase input voltage and the desired third phase input voltage is provided.

15. A method of operating a three phase primary winding structure of a system for inductive power transfer, the method comprising:
  providing a primary winding structure comprising a first phase line, a second phase line, and a third phase line;
  controlling, with a control unit and in a standard operational mode, a first phase input voltage, a second phase input voltage, and a third phase input voltage such that a predetermined phase shift between all three phase input voltages is provided;
  controlling, with the control unit and in a modified operational mode, the first phase input voltage, the second phase input voltage, and the third phase input voltage such that the set of phase shift values comprises at most two non-zero values and all non-zero phase shift values are equal;
  varying a frequency of at least one phase input voltage;
  adapting the frequency/frequencies of the phase input voltage(s) to a resonant frequency of a virtual single phase line; and
  providing the virtual single phase line between the input terminals of the phase input voltages which provide the non-zero phase shift value(s).

* * * * *